United States Patent
Wu et al.

(10) Patent No.: US 7,103,326 B2
(45) Date of Patent: Sep. 5, 2006

(54) ADAPTIVE TRANSMIT DIVERSITY WITH QUADRANT PHASE CONSTRAINING FEEDBACK

(75) Inventors: Jingxian Wu, Colombia, MO (US); Andreas Molisch, Arlington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 423 days.

(21) Appl. No.: 10/648,558

(22) Filed: Aug. 25, 2003

(65) Prior Publication Data

US 2005/0048940 A1    Mar. 3, 2005

(51) Int. Cl.
*H03C 7/02* (2006.01)
*H04B 1/02* (2006.01)
*H04B 7/02* (2006.01)

(52) U.S. Cl. .................... 455/101; 455/562.1; 375/299
(58) Field of Classification Search ................ 455/101, 455/504, 506, 517, 522, 561, 562.1; 375/299
See application file for complete search history.

(56) References Cited

U.S. PATENT DOCUMENTS

| 6,754,286 | B1 * | 6/2004 | Hottinen et al. | ............ | 375/299 |
| 6,892,059 | B1 * | 5/2005 | Kim et al. | .................. | 455/272 |
| 2002/0186785 | A1 * | 12/2002 | Hoshino et al. | ............. | 375/299 |
| 2003/0148738 | A1 * | 8/2003 | Das et al. | .................. | 455/67.5 |

OTHER PUBLICATIONS

S.M. Alamouti, "A simple transmit diversity technique for wireless communications," *IEEE J. Select. Area Commun.*, vol. 16, pp. 1451-1458, Oct. 1998.

V. Tarokh, H. Jafarkhani, and A.R. Calderbank, "Space-time block codes from orthogonal designs," *IEEE Trans. Info. Theory*, vol. 45, pp. 1456-1467, Jul. 1999.

Y. Xin, Z. Wang, and G.B. Giannakis, "Space-time diversity systems based on linear constellation precoding," *IEEE Trans. Wireless Commun.*, vol. 2, pp. 294-309, Mar. 2003.

S. Zhou, G.B. Giannakis, "Optimal transmitter eigen-beamforming and space-time block coding based on channel mean feedback," *IEEE Trans. Signal Processing*, vol. 50, pp. 2599-2613, Oct. 2002.

J.H. Horng, L. Li, and J. Zhang, "Adaptive space-time transmit diversity for MIMO systems," in *Proc. IEEE Veh. Techno. Conf. VTC'03 Spring*, pp. 1070-1073, Apr. 2003.

M.K. Simon, and M.-S. Alouini, "A unified approach to the performance analysis of digital communication over generalized fading channels," *Proc. of IEEE*, vol. 86, pp. 1860-1877, Sep. 1998.

\* cited by examiner

*Primary Examiner*—Nguyen T. Vo
*Assistant Examiner*—Adeel Haroon
(74) *Attorney, Agent, or Firm*—Dirk Brinkman; Andrew J. Curtin

(57) ABSTRACT

A method increases transmit diversity gain in a wireless communication system. In the wireless network, a transmitter has multiple antennas and a receiver has one antenna. A phase of each of received signal is measured. One signal is selected as a reference signal. For each other signal, a phase, with respect to the phase of the reference signal, is measured independently to determine feedback information indicating a required rotation of each other signal so that a phase of each other rotated signal is within an identical quadrant as the phase of the reference signal. The feedback information for each other signal is sent to the transmitter. In the transmitter, each other signal is phase rotated according to the corresponding feedback information before the signal is transmitting to the receiver.

9 Claims, 3 Drawing Sheets

ADAPTIVE TRANSMIT DIVERSITY WITH QUADRANT PHASE CONSTRAINING FEEDBACK

FIELD OF THE INVENTION

This invention relates generally to transmit diversity gain in wireless communications networks, and more particularly to maximizing the diversity gain adaptively in transmitters.

BACKGROUND OF THE INVENTION

The next generation of wireless communication systems is required to provide high quality voice services as well as broadband data services with data rates far beyond the limitations of current wireless systems. For example, high speed downlink packet access (HSDPA), which is endorsed by the 3rd generation partnership project (3GPP) standard for wideband code-division multiple access (WCDMA) systems, is intended to provide data rates up to 10 Mbps or higher in the downlink channel as opposed to the maximum 384 Kbps supported by the enhanced data rate for GSM evolution (EDGE), the so-called 2.5G communication standard, see 3GPP: 3GPP TR25.848 v4.0.0, "3GPP technical report: Physical layer aspects of ultra high speed downlink packet access," March 2001, and ETSI. GSM 05.05, "Radio transmission and reception," ETSI EN 300 910 V8.5.1, November 2000.

Antenna diversity can increase the data rate. Antenna diversity effectively combats adverse effects of multipath fading in channels by providing multiple replicas of the transmitted signal at the receiver. Due to the limited size and cost of a typical end user device, e.g., a cellular telephone or handheld computer, downlink transmissions favor transmit diversity over receiver diversity.

One of the most common transmit diversity techniques is space-time coding, see Alamouti, "A simple transmit diversity technique for wireless communications," IEEE J Select. Area Commun., vol. 16, pp. 1451–1458, October 1998, Tarokh et al., "Space-time codes for high data rate wireless communication: performance criterion and code construction," IEEE Trans. Info. Theory, vol. 44, pp. 744–765, March 1998, Tarokh wt al., "Space-time block codes from orthogonal designs," IEEE Trans. Info. Theory, vol. 45, pp. 1456–1467, July 1999, and Xin et al., "Space-time diversity systems based on linear constellation preceding," IEEE Trans. Wireless Commun., vol. 2, pp. 294–309, March 2003.

With space-time coding, data symbols are encoded in both the time domain (transmission intervals) and the space domain (transmit antenna array). For systems with exactly two transmit antennas, Alamouti et al. describes orthogonal space-time block code (STBC). Full diversity order is achieved with simple algebraic operations.

Space-time trellis coding exploits the full potential of multiple antennas by striving to maximize both the diversity gains and coding gains of the system. Better performance is achieved at the cost of relative higher encoding and decoding complexity.

The above techniques are designed under the assumption that the transmitter has no knowledge of the fading channels. Thus, those techniques can be classified as having open loop transmit diversity.

System performance can be further improved when some channel information is available at the transmitter from feedback information from the receiver. Those systems are classified as having closed loop transmit diversity. The feedback information can be utilized in transmit diversity systems to maximize the gain in the receiver, see Jongren et al., "Combining beamforming and orthogonal space-time block coding," IEEE Trans. Info. Theory, vol. 48, pp. 611–627, March 2002, Zhou et al., "Optimal transmitter eigen-beamforming and space-time block coding based on channel mean feedback," IEEE Trans. Signal Processing, vol. 50, pp. 2599–2613, October 2002, Rohani et al., "A comparison of base station transmit diversity methods for third generation cellular standards," Porc. IEEE Veh. Techno. Conf. VTC'99 Spring, pp. 351–355, May 1999, Derryberry et al., "Transmit diversity in 3G CDMA systems," IEEE Commun. Mag., vol. 40, pp. 68–75, April 2002, Lo, "Maximum ratio transmission," IEEE Trans. Commun., vol. 47, pp. 1458–1461, October 1999, Huawe, "STTD with adaptive transmitted power allocation," TSGR1-02-0711, May, 2002, and Homg et al., "Adaptive space-time transmit diversity for MIMO systems," Proc. IEEE Veh. Techno. Conf. VTC'03 Spring, pp. 1070–1073, April 2003.

The space-time block coding can be combined with linear optimum beamforming. Linear encoding matrices can be optimized based on the feedback information of the fading channels. Transmit adaptive array (TxAA) is another closed loop transmit diversity system with the transmitted symbols encoded only in the space domain. Increased performance can be achieved, provided the fading channel vector is known to the transmitter. The concept of space encoded transmit diversity can be generalized as maximal ratio transmission (MRT).

All of the above closed loop systems require the feedback information to be M×N complex-valued vectors, where M and N are respectively the number of antennas at the transmitter and receiver. The vector elements are either the channel impulse response (CIR), or statistics of the CIR, e.g., mean or covariance. Considerable bandwidth is consumed by the feedback information in the reverse link from the receiver to the transmitter.

To overcome this problem, suboptimum methods with less feedback information are possible. Adaptive space-time block coding (ASTTD) uses a real-valued vector made up of power ratios of the fading channels as feedback information. There, the feedback information is used to adjust the power of each transmission antenna. That technique still consumes a large number of bits.

Therefore, it is desired to maximize transmit diversity gain while reducing the number of bits that are fed back to the transmitter.

SUMMARY OF THE INVENTION

The invention provides an adaptive transmit diversity method with simple feedback for a wireless communication systems.

It is an object of the invention to achieve better system performance with less feedback information and fewer computations than conventional transmit diversity methods. It is particularly desired to simplify the operation of a receiver.

With simple linear operations at both the transmitter and receiver, the method requires only one bit of feedback information for systems with two antennas at the transmitter and one antenna at the receiver.

When there are more than two antennas at the transmitter, the number of feedback bits is 2(M−1) bits, where M is the number of antennas. This is still significantly fewer than the number of bits required by most conventional close loop transmit diversity techniques.

The computational complexity of the invention method is much lower compared with optimum quantized TxAA closed loop technique with the same amount of feedback.

In addition, the method outperforms some closed loop transmit diversity techniques that have more information transmitted in the feedback channel.

DETAILED DESCRIPTION OF THE PREFERRED EMBODIMENT

Figure 1:
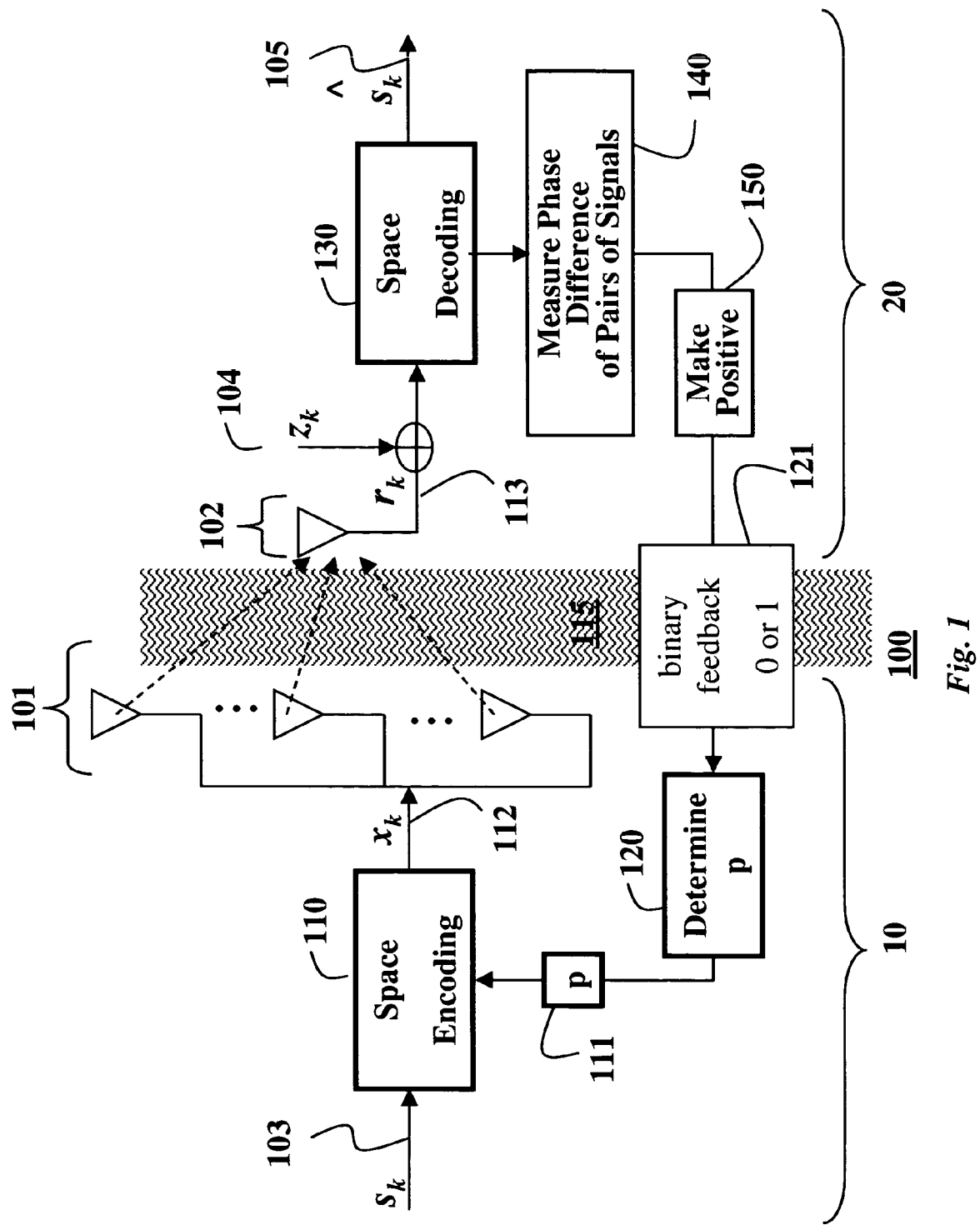
FIG. 1 is a block diagram of a system with diversity gain according to the invention.

FIG. 1 shows a baseband representation of a diversity system 100 according to our invention. Our system has M antennas 101 at a transmitter 10, for example, a base station, and one antenna 102 at a receiver 20, e.g., a mobile cellular telephone.

At a time instant k, a modulated symbol $s_k$ 103 is linearly encoded 110 at the transmitter in a space domain according to a space encoding vector 111

$$p_k = [p_1(k), p_2(k), \ldots, p_M(k)] \in C^{1 \times M}$$

The encoded transmit data 112 are $x_k = [x_1(k), x_2(k), \ldots, x_M(k)] = p_k \cdot s_k$, with $x_m(k)$ being transmitted at the $m^{th}$ transmit antenna 101.

In our adaptive transmit diversity method, the space encoding vector $p_k$ 111 is determined 120 at the transmitter according to feedback information 121 determined from space decoding 130 of the received signal 105 at the receiver.

Specifically, the feedback information 121 relates to phase differences between pairs of received signals in a fading transmission channel 115. It is desired to minimize the phase difference between signals, so that diversity gain is maximized at the receiver. Furthermore, it is desired to minimize the number of bits required to indicate the phase difference. In addition, it is desired to reduce the amount of computation involved in generating the feedback information at the receiver 20.

The received signal is a sum of the propagation signals from all the transmit antennas subject to the channel impulse responses, plus additive white Gaussian noise (AWGN) 104 with variance $N_0/2$ per dimension. At the receiver, samples $r_k$ 113 of the received signal $R_x$ can be expressed by $$r(k) = \sqrt{\frac{E_s}{M}} \cdot x_k h_k + z_k, \quad (1)$$

$$= \sqrt{\frac{E_s}{M}} \cdot (p_k h_k) \cdot s_k + z_k,$$

where $E_s$ is the sum of the transmit power of all the transmit antennas, M is the number of antennas, $z_k$ is the additive noise 104. The time-varying channel impulse response (CIR) of each fading channel is $$h_k = [h_1(k), h_2(k), \ldots, h_M(k)]^T \in C^{M \times 1},$$

where $h_m(k)$ is the CIR for the fading channel between the $m^{th}$ transmit antenna and the receive antenna, and $(\cdot)^T$ denotes a matrix transpose.

With the system model defined by equation (1), an optimum space encoding vector $\hat{p}_k$ for maximizing the output SNR is $$\hat{p}_k = \frac{h_k^H}{h_k h_k^H}, \quad (2)$$

where $(\cdot)^H$ denotes a Hermitian matrix operator. This scheme is called transmit adaptive array (TxAA). However, forming the optimum space encoding vector requires a complete knowledge of the CIR vector $h_k$, which includes 2M real scalar values. Hence, it is impractical to implement the TxAA scheme in systems where limited resources are allocated to the feedback channel.

To reduce the amount of feedback information for a TxAA scheme, a quantized feedback method is described by Love et al., "Equal gain transmission in multiple-input multiple-output wireless systems," IEEE Trans. Commun., Vol. 51, pp. 1102–1110, July, 2003.

There, the space encoding vector is obtained by a joint determination of the optimum transmit phases by means of an exhaustive search as follows $$\hat{p}_k = \arg\min_{p_k \in P} p_k h_k h_k^H p_k^H, \quad (3)$$

where P is the set of all the possible quantized space encoding vectors. The set contains $2^{b(M-1)}$ possible vectors for systems with b bits quantization and M transmit antennas. In order to find the optimum quantized feedback vector $\hat{p}_k$, the receiver must determine jointly and exhaustively the values of $p_k h_k h_k^H p_k^H$ for all the possible $2^{b(M-1)}$ encoding vectors to select the optimum vector. Each computation of the cost function involves approximately $M^2$ complex multiplications.

Therefore, the total complexity incurred for the feedback information alone is in the order of $O(2^{b(M-1)} \times M^2)$, which increases exponentially with the number of transmit antennas and is quite considerable when the number of antennas is larger than two.

To balance the system performance, the size of feedback information, and the computational complexity of the system, the adaptive transmit diversity method according to our invention uses a quadrant phase constraining method to determine the feedback information 121.

We use the term 'quadrant' conventionally. By quadrant, we mean a quarter of a circle or a sector of ninety degrees. Thus, the amount of feedback information and the computational complexity is greatly reduced when compared with the prior art.

Method Description

The present adaptive transmit diversity method is described first for a simple system with two transmit antennas and one receive antenna. In this simple case, exactly one bit of feedback information is required to generate the space encoding vector 111 used by the space encoding 110. In a general method for systems with more than two transmit antennas (M>2), it takes 2(M−1) bits of feedback information to determine 120 the space encoding vector 111.

Systems with Two Transmit Antennas

For systems with two transmit antennas, we define our space encoding vector 111 as $$p_k = [1, (-1)^{b_k}], \quad (4)$$

where $b_k \in \{0,1\}$ is the quantized binary feedback information 121 sent out from the receiver. The single feedback bit $b_k$, either zero or one, is based on an estimated phase rotation in the CIR $h_k$ as follows, $$b_k = \begin{cases} 0, & \text{if } \Re\{h_1(k)h_2^*(k)\} > 0, \\ 1, & \text{otherwise,} \end{cases} \quad (5)$$

where $h_m(k)$ is the time-varying channel impulse response, $(\cdot)^*$ denotes a complex conjugate, and the operation $\Re(\cdot)$ returns the real part of the operand. In other words, the bit is zero if the product of the CIR of one channel with the complex conjugate of the CIR of the other channel is positive, and one otherwise, and thus, the space encoding vector p 111 is either [1,1] or [1, −1], respectively.

With the definition of the space encoding vector $p_k$ in equation (3), the transmitted signal vector 112 is $x_k = [s_k, (-1)^{b_k} s_k]$. Replacing the vector $x_k$ in equation (1), we have the received sample as $$r(k) = \sqrt{\frac{E_s}{2}} [h_1(k) + h_2(k)(-1)^{b_k}] \cdot s_k + z_k. \quad (6)$$

In receivers with coherent detection, the received sample r(k) is multiplied by $(p_k h_k)^H = h_1^*(k) + h_2^*(k)(-1)^{b_k}$ to form the decision variable y(k), $$y(k) = (h_1^*(k) + (-1)^{b_k} h_2^*(k)) \cdot r_k, \quad (7)$$

$$= \sqrt{\frac{E_s}{2}} [|h_1(k)|^2 + |h_2(k)|^2 + (-1)^{b_k} \cdot 2\Re\{h_1(k)h_2^*(k)\}] s_k + v_k,$$

where $v_k = [h_1^*(k) + (-1)^{b_k} h_2^*(k)] \cdot z_k$ is the noise component of the decision variable. The variance of noise component $v_k$ is $$\sigma_v^2 = [|h_1(k)|^2 + |h_2(k)|^2 + (-1)^{b_k} \cdot 2\Re\{h_1(k)h_2^*(k)\}] \cdot N_0. \quad (8)$$

It can be seen from equation (5) that $$(-1)^{b_k} \cdot 2\Re\{h_1(k)h_2^*(k)\} = 2|\Re\{h_1(k)h_2^*(k)\}|, \quad (9)$$

thus the instantaneous output SNR $\gamma$ at the receiver can be written as $$\gamma = \frac{\gamma_0}{2} \cdot [|h_1(k)|^2 + |h_2(k)|^2 + 2|\Re\{h_1(k)h_2^*(k)\}|], \quad (10)$$

$$= \gamma_0 \cdot (g_c + g_b), \quad (11)$$

where $$\gamma_0 = \frac{E_s}{N_0}$$

is the SNR without diversity. The conventional diversity gain $g_c$ and the feedback diversity gain $g_b$ are defined as $$g_c = \frac{1}{2} [|h_1(k)|^2 + |h_2(k)|^2], \quad (12)$$

$$g_b = 2|\Re\{h_1(k)h_2^*(k)\}|. \quad (13)$$

The conventional diversity gain $g_c$ is the same as the diversity gain of the orthogonal space-time block coding (STBC), while the feedback diversity gain $g_b$ is the extra diversity gain contributed by the binary feedback information 121.

From the above equations, we can see that with only one bit $b_k$ of feedback information 121 in a closed loop system, the output SNR of the proposed transmission diversity scheme, which also considers feedback diversity gain, is always better than when just the orthogonal STBC gain is considered in an open loop system, although the transmitted signals are only encoded in the space domain.

Systems with More Than Two Transmit Antennas

The process described above is for systems with two transmit antennas. If there are more than two antennas (M>2) at the transmitter, then a modified transmit diversity method with 2(M−1) bits feedback information is used.

For systems with m>2 transmit antennas, we define the space encoding vector 111 as $$p_k = \left[1 \; \exp\left[\frac{i \cdot q_2(k)\pi}{2}\right] \; \ldots \; \exp\left[\frac{i \cdot q_M(k)\pi}{2}\right]\right], \quad (14)$$

where $i^2 = -1$, and $q_m(k) \in \{0,1,2,3\}$ is the feedback information from the receiver, for m=2,3, ..., M. For consistence of representation, we let $q_1(k) = 0$, for $\forall k$.

By such definitions, each $q_m(k)$ contains two bits of information, and there are a total of 2(M−1) bits of feedback information used to form the space encoding vector $p_k$. Combining equations (1) and (14), we can write the received sample r(k) as $$r(k) = \sqrt{\frac{E_s}{M}} \left\{ \sum_{m=1}^{M} \exp\left[\frac{i \cdot q_m(k)\pi}{2}\right] h_m(k) \right\} \cdot s_k + z_k. \quad (15)$$

At the decoder 130, the decision variable y(k) is obtained by multiplying the received sample r(k) with $(p_k h_k)^H$. This can be written as $$y(k) = \sqrt{\frac{E_s}{M}} \left| \sum_{m=1}^{M} \exp\left[\frac{i \cdot q_m(k)\pi}{2}\right] h_m(k) \right|^2 \cdot s_k + v_k, \quad (16)$$

$$= \sqrt{\frac{E_s}{M}} (g_c + g_b) \cdot s_k + v_k,$$

where $v_k=(p_k h_k)^H \cdot z_k$ is the noise component with variance $|p_k h_k|^2 \cdot N_0$, and the conventional and feedback diversity gains $g_c$ and $g_b$ are defined respectively as $$g_c = \frac{1}{M}\sum_{m=1}^{M} |h_m(k)|^2, \text{ and} \quad (17)$$

$$g_b = \frac{2}{M}\sum_{m=1}^{M}\sum_{n=m+1}^{M} \mathbb{R}\left\{h_m(k)h_n^*(k)\exp\left[i\cdot\pi\frac{q_m(k)-q_n(k)}{2}\right]\right\}. \quad (18)$$

In the equations above, the conventional diversity gain $g_c$ is fixed for a certain value of M, while the feedback diversity gain is maximized by appropriately generating the feedback information from the quantity $q_m(k)$.

With the 2(M−1) bits of information, we can maximize $g_b$ by selecting $q_m(k)$ such that all the summed elements of $g_b$ are positive. One of the summed element of $g_b$ can be expressed as $$\mathbb{R}\left\{h_m(k)h_n^*(k)\exp\left[i\cdot\pi\frac{q_m(k)-q_n(k)}{2}\right]\right\} = |h_m(k)||h_n(k)|\cos(\Delta\theta_{mn}), \quad (19)$$

where $\theta_m \in [0,2\pi)$ is the phase of $h_m(k)$.

The terms in equation (19) are positive when the following condition is satisfied $$|\Delta\theta_{mn}| \leq \pi/2, \text{ for } \forall m \neq n. \quad (20)$$

In other words, the absolute difference in phase between two signals is less than 90 degrees.

To satisfy this maximization condition in equation (20), we adjust the value $q_m(k)$ so that the phases $$\theta_m + \frac{q_m(k)}{2}\pi,$$

for m=1,2, ..., M, for all received signals are within 90 degrees of each other. Therefore, our method is a quadrant phase constraining method.

Without loss of generality, we keep the phase $\theta_1$ of the signal in a selected sub-channel $h_1(k)$ unchanged. We call the signal in the selected sub-channel a reference signal, and its phase a reference phase. The reference phase can be selected randomly from any of the M transmit antennas, or the signal in the channel where the CIR has a highest power.

Now, our goal is to make the phases difference between all the signals be less than or equal to $$\frac{\pi}{2}.$$

That is, we constrain all the rotated phases to a sector that has a 90 degree angle or less.

Therefore, the phases $\theta_m$ of the signals in all other sub-channels are rotated at the transmiter $$\frac{q_m(k)}{2}\pi$$

according to the feedback information bits so that the absolute phase difference is less than 90 degrees. The rotation can be clockwise or counter-clockwise, as long as the rotation is consistent. By such means, only two bits of feedback information are required to form each $q_m(k)$.

Figure 2:
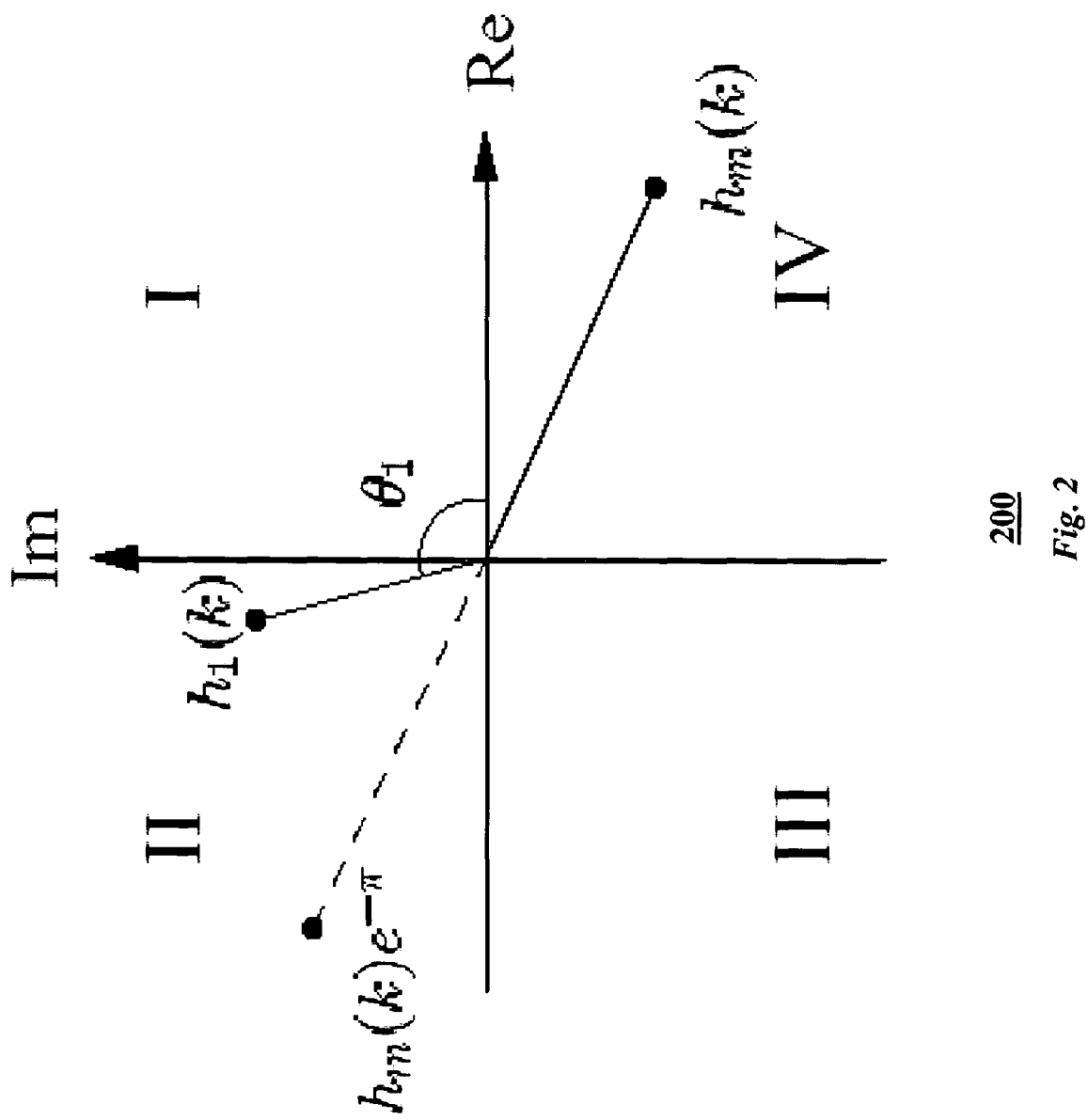
FIG. 2 is a diagram of four quadrants of a coordinate system for indicating quadrant phase constraining according to the invention.

One method to fulfill the quadrant phase constraining condition is to put all the phases in the same coordinate quadrant as the reference phase. As shown in FIG. 2, we label four quadrants I–IV of the Cartesian coordinate system for real (Re) and imaginary (Im) numbers. The quadrant number of any angle $\phi \in [0,2\pi)$ is $$\left\lceil \frac{2\phi}{\pi} \right\rceil,$$

where $\lceil \square \rceil$ denotes rounding up to the nearest integer.

With the above analyses, the feedback information $q_m(k)$ for m=2,3, ..., M is determined at the receiver based on the phase difference between any pair of received signals.

$$q_m(k) = \left\lceil \frac{2\theta_1}{\pi} \right\rceil - \left\lceil \frac{2\theta_m}{\pi} \right\rceil. \quad (21)$$

The example in FIG. 2 has $\theta_1$ in quadrant II, and $\theta_m$ in quadrant IV. With equation (21), we obtain $q_m(k)=-2$, which corresponds to rotating $\theta_m$ by $\pi$ radians clockwise (180°), and the rotated phase $$\theta_m - \frac{q_m(k)}{2}\pi$$

is now in quadrant II.

Figure 3:
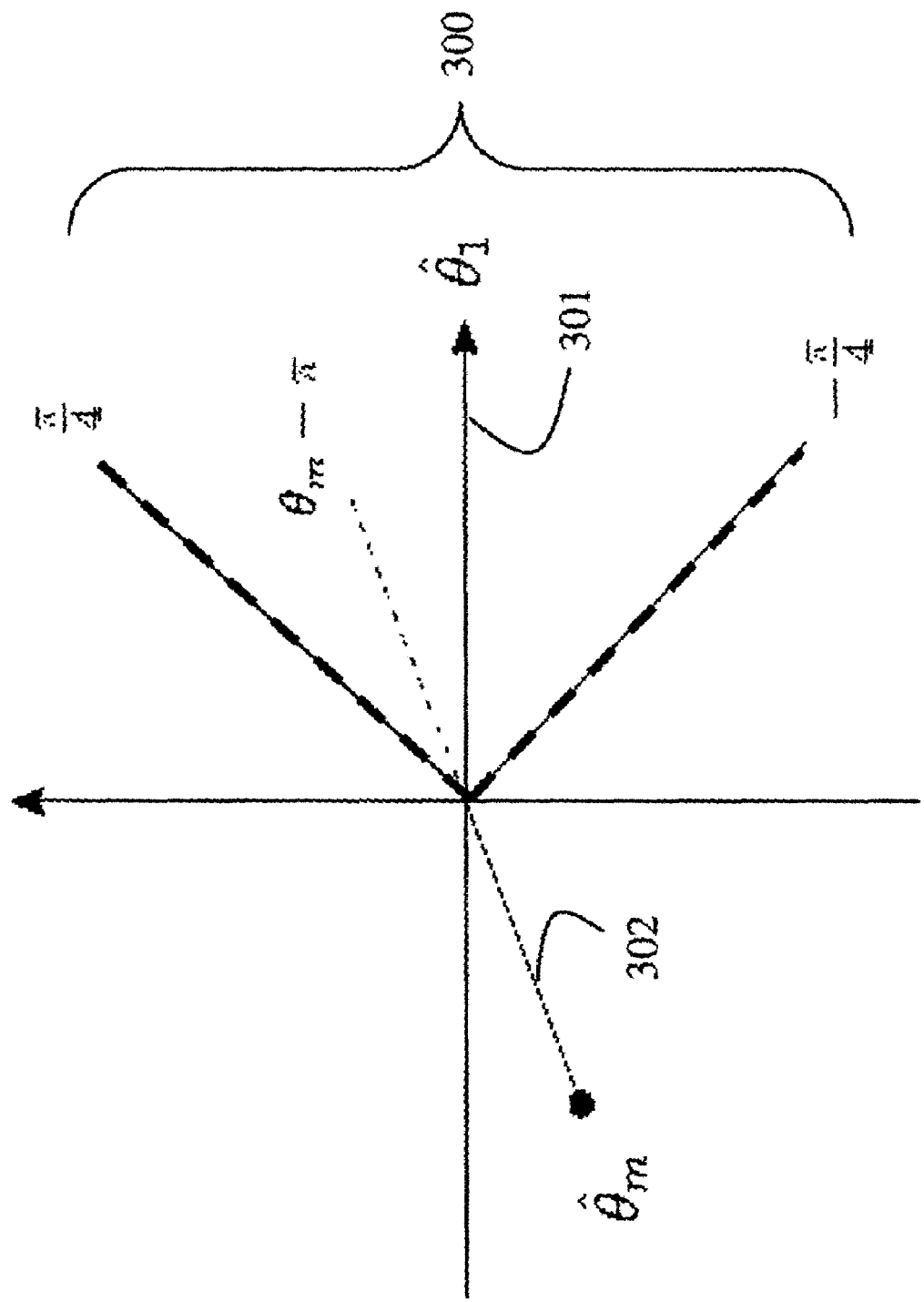
FIG. 3 is a diagram of a normalized coordinate system with a phase of a reference signal on the x-axis of the coordinate system according to the invention.

Another method is to put all the phases in a 90 degree sector 300 normalized to the reference phase on the x-axis 301, as shown in FIG. 3. We normalize all the phases with respect to the reference phase as follows $$\tilde{\theta}_m = \theta_m - \theta_1 + 2l\pi,$$

where an integer l is selected such that the normalized phase $\tilde{\theta}_m$ is in the range of $[0,2\pi)$. The normalized phase $\tilde{\theta}_m$ is rotated, e.g., counter-clockwise, by the angle of $$q_m^{\frac{\pi}{2}},$$

so that the rotated angle $$\tilde{\theta}_m + q_m^{\frac{\pi}{2}}$$

is in the quadrant phase sector from $[-\pi/4, \pi/4]$ of the coordinate system as shown in FIG. 3.

Accordingly, we generate the feedback information $q_m$ as $$q_m = \begin{cases} 4 - \left\lfloor \dfrac{\tilde{\theta}_m + \pi/4}{\pi/2} \right\rfloor, & \tilde{\theta}_m \in \left[\dfrac{\pi}{4}, \dfrac{7\pi}{4}\right), \\ 0, & \text{otherwise,} \end{cases} \quad (5)$$

where $\lfloor \square \rfloor$ returns a nearest smaller integer.

An example is given in FIG. 3, where $\tilde{\theta}_m = 9\pi/8$ 302. From equation (25), we obtain $q_m=2$, and the corresponding rotated angle is $$\tilde{\theta}_m - q_m \frac{\pi}{2} = \pi/8,$$

which is in the angle sector of $$\left[-\frac{\pi}{4}, \frac{\pi}{4}\right]$$

300 of the normalized coordinate system. By applying the same operations, one by one, to all the normalized phases, all phases are rotated into the same quadrant 300, and the non-negativity of each summed element of the diversity gain $g_b$ is guaranteed.

This method achieves a non-negative feedback diversity gain by constraining all the rotated phases of the CIRs of one sub-group in an angle sector of $\pi/2$, hence, our method is quadrant phase constraining.

In our method, the value of $q_m$ is determined independently for each of the transmit antennas, instead of jointly for all antennas as in the prior art quantization method. Therefore, the computational complexity of our method increases linearly with the number of transmit antennas, in contrast with an exponentially increased complexity in the prior art quantization method.

The feedback information computed from our quadrant phase constraining method guarantees that all the elements described in equation (19) are positive for $\forall m \neq n$, and the maximized feedback diversity gain $g_b$ contributed by the feedback information is $$g_b = \frac{2}{M} \sum_{m=1}^{M} \sum_{n=m+1}^{M} |h_m(k)||h_n(k)||\cos(\Delta\theta_{mn})|. \quad (22)$$

Combining equations (16), (17) and (22), yields the output SNR $\gamma$ at the detector receiver as $$\gamma = \gamma_0 \cdot \quad (23)$$

$$\left[\frac{1}{M}\sum_{m=1}^{M}|h_m(k)|^2 + \frac{2}{M}\sum_{m=1}^{M}\sum_{n=m+1}^{M}|h_m(k)||h_n(k)||\cos(\Delta\theta_{mn})|\right], \quad (24)$$

$$= \gamma_0 \cdot (g_c + g_b),$$

where $$\gamma_0 = \frac{E_s}{N_0}$$

is the SNR without diversity, and the diversity gains $g_c$ and $g_b$ are given in equations (17) and (22), respectively.

Complexity Analysis

As described above, our method generates the feedback information for each transmit antenna independently. Therefore, the computation complexity increases only linearly with the number of transmit antennas. However, for the prior art quantized feedback TxAA method of Love et al., the computational complexity increases exponentially with the number of transmit antennas. For systems with four transmit antennas and two bits representation of each element of the space encoding vector $p_k$, there are totally $2^{2\times(4-1)}=64$ possible values of $p_k$, which means the prior art mobile unit of the system employing quantized feedback must compute $p_k h_k h_k^H p_k^H$ for all the 64 possible vectors of $p_k$ before the feedback information is available, and each computation of the cost function $p_k h_k h_k^H p_k^H$ involves approximately $4^2=16$ complex multiplications.

However, with the our method, we need only three computations, instead of 64, for all the antennas, and each operation involves approximately two real multiplications. Therefore, the computational complexity of our method is only $(2\times3)/(64\times16\times2)=0.3\%$ of the prior art quantized feedback TxAA for system with four antennas. For a system with more transmit antennas, even larger computational complexity saving are achieved by our method.

Performance Bounds

Based on the statistical properties of the output signal 105 at the receiver 20, the theoretical performance bounds of the proposed diversity scheme as $$P^U(E) = \frac{1}{\pi}\int_0^{\frac{\pi}{2}} \prod_{m=1}^{M}\left(1 + \frac{\gamma_m}{\sin^2\theta}\right)^{-1} d\theta, \quad (25)$$

$$P^L(E) = \frac{1}{2} - \frac{1}{\pi}\int_0^{\frac{\pi}{2}} \frac{\exp(-\tan\theta)}{\sin 2\theta} \Im\{\phi(2\sqrt{\tan\theta})\} d\theta. \quad (26)$$

The derivations of $P^U(E)$ and $P^L(E)$ are omitted here for the purpose of brevity. With the theoretical performance bounds given in equation (25) and (26), the actual error probability $P(E)$ of the proposed diversity scheme satisfies $$P^U(E) \geq P(E) \geq P^L(E). \quad (27)$$

The significance of equations (25–27) is that these equations evaluate the method according to the invention on a theoretical basis, and these equations can be used as a guide for the design wireless communication systems.

It should be noted that the transmit diversity method described for systems with more than two transmit antennas can also be implemented for systems with two transmit antennas. In this case, the required number of feedback bits is $2\times(2-1)=2$, which is one bit more than required for the transmit diversity for strictly two antennas described above. This extra bit contributes to a slight performance improvement.

It should be noted that the conventional full-rate STBC and close loop technique based on the orthogonal STBC can only be implemented for systems with exactly two transmit antennas. In contrast, the transmit diversity method according to the invention can be used for systems with an arbitrary number of transmit antennas. This is extremely useful for a high speed downlink data transmission of next generation wireless communication systems, where higher diversity order are required to guarantee high data throughput in the downlink with multiple transmit antennas and one receive antenna.

EFFECT OF THE INVENTION

The method according to the invention outperforms conventional orthogonal STBC by up to 2 dB. The performance of the version with two bits of feedback information is approximately 0.4 dB better than the version with one bit of feedback information.

The prior art full rate STTD and ASTTD systems can be implemented for systems with at most two transmit antennas. In contrast, our transmit diversity method can be used for systems with an arbitrary number of transmit antennas. Furthermore, the performance of the method improves substantially linearly with the increasing number of transmit antennas.

Our method is very computational efficient compared to the prior art quantized method. Our method requires only 0.3% computation efforts of the prior art quantized feedback TxAA for systems with four transmit antennas. This computation saving is significant in a receiver, such as a cellular phone, where battery life is an importance performance factor.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for increasing transmit diversity gain in a wireless communication system including a transmitter with a plurality of antennas and a receiver with one antenna, comprising:

measuring a phase of each of a plurality of signals received by the antenna in the receiver;

selecting one of the plurality of signals as a reference signal;

determining, independently for each other signal with respect to the reference signal, feedback information indicating a required rotation of each other signal so that a phase of each other signal is within an identical quadrant as the phase of the reference signal;

sending the feedback information for each other signal to the transmitter, in which the transmitter has two antennas, and the feedback information is one bit, and in which a space encoding vector is $p_k=[1,(-1)^{b_k}]$, where $b_k \in \{0,1\}$ is the feedback information sent from the receiver;

phase rotating, in the transmitter, each other signal according to the corresponding feedback information to produce a rotated signal; and transmitting the reference signal and each rotated signal to the receiver.

2. The method of claim 1, in which the reference signal is selected randomly from the plurality of signals.

3. The method of claim 1, further comprising:

measuring a power of each of the plurality of signals; and selecting a highest power signal as the reference signal.

4. The method of claim 1, in which the transmitter has more than two antennas, and the feedback information is two bits for each other signal.

5. The method of claim 4, in which a space encoding vector is $$p_k = \left[ 1 \quad \exp\left[\frac{i \cdot q_2(k)\pi}{2}\right] \quad \cdots \quad \exp\left[\frac{i \cdot q_M(k)\pi}{2}\right] \right],$$

where $i^2=-1$, and $q_m(k) \in \{0,1,2,3\}$ is the feedback information sent from the receiver, for $m=2,3,\ldots,M$, and $q_1(k)=0$, for $\forall k$.

6. The method of claim 1, further comprising:

normalizing the quadrant to the phase of the reference signal.

7. The method of claim 6, in which the phases of the other signals with respect to the phase of the reference signal are $\tilde{\theta}_m = \theta_m - \theta_1 + 2l\pi$, where an integer l is selected such that each normalized phase $\tilde{\theta}_m$ is in a range of $[0, 2\pi)$.

8. The method of claim 1, in which the receiver is a cellular telephone.

9. A system for increasing transmit diversity gain in a wireless communication system, comprising:

a receiver including one antenna, and further comprising:

means for measuring a phase of each of a plurality of signals received by the one antenna;

means for selecting one of the plurality of signals as a reference signal; and means for determining, independently for each other signal with respect to the reference signal, feedback information indicating a required rotation of each other signal so that a phase of each other signal is within an identical quadrant as the phase of the reference signal, in which the transmitter has two antennas, and the feedback information is one bit, and in which a space encoding vector is $p_k=[1,(-1)^{b_k}]$, where $b_k \in \{0,1\}$ is the feedback information sent from the receiver; and a transmitter with a plurality of antennas, and further comprising:

means for receiving the feedback information;

means for phase rotating each other signal according to the corresponding feedback information to produce a rotated signal; and means for transmitting the reference signal and each rotated signal to the receiver.

* * * * *